United States Patent
Yang et al.

(10) Patent No.: US 12,022,562 B2
(45) Date of Patent: Jun. 25, 2024

(54) SIDELINK RADIO RESOURCE MANAGEMENT USING SIDELINK DISCOVERY SIGNAL

(71) Applicant: QUALCOMM Incorporated, San Diego, CA (US)

(72) Inventors: Wei Yang, San Diego, CA (US); Hung Dinh Ly, San Diego, CA (US); Karthika Paladugu, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/149,601

(22) Filed: Jan. 14, 2021

(65) Prior Publication Data

US 2022/0225072 A1    Jul. 14, 2022

(51) Int. Cl.
*H04W 8/00*     (2009.01)
*H04L 1/00*     (2006.01)
*H04W 24/10*    (2009.01)
*H04W 72/02*    (2009.01)
*H04W 72/542*   (2023.01)
*H04W 76/27*    (2018.01)

(52) U.S. Cl.
CPC ........... *H04W 8/005* (2013.01); *H04L 1/0003* (2013.01); *H04W 24/10* (2013.01); *H04W 72/02* (2013.01); *H04W 72/542* (2023.01); *H04W 76/27* (2018.02)

(58) Field of Classification Search
CPC ... H04W 8/005; H04W 76/27; H04W 72/542; H04W 24/10; H04L 1/0003
See application file for complete search history.

(56) References Cited

U.S. PATENT DOCUMENTS

| | | | |
|---|---|---|---|
| 2012/0059935 A1* | 3/2012 | Patil | H04W 72/02 709/226 |
| 2014/0301228 A1* | 10/2014 | Kwak | H04W 24/10 370/252 |
| 2015/0208332 A1* | 7/2015 | Baghel | H04W 8/005 370/255 |
| 2016/0242065 A1* | 8/2016 | Fukuta | H04W 28/0221 |
| 2018/0249516 A1* | 8/2018 | Jung | H04W 76/10 |
| 2019/0320475 A1* | 10/2019 | Li | H04W 8/005 |
| 2020/0107234 A1* | 4/2020 | Kim | H04W 36/0069 |
| 2020/0221532 A1* | 7/2020 | Jung | H04W 76/10 |
| 2021/0014913 A1* | 1/2021 | Zhang | H04W 76/11 |
| 2021/0105863 A1* | 4/2021 | Martin | H04W 88/04 |
| 2021/0175935 A1* | 6/2021 | Kwon | H04W 52/0229 |
| 2021/0242960 A1* | 8/2021 | Li | H04L 1/0015 |
| 2022/0312178 A1* | 9/2022 | Wu | H04W 8/005 |
| 2022/0369289 A1* | 11/2022 | Lee | H04W 72/56 |

* cited by examiner

*Primary Examiner* — Won Tae C Kim
(74) *Attorney, Agent, or Firm* — Arun Swain

(57) ABSTRACT

A method and apparatus enable sidelink resource management using a sidelink discovery signal. The method provides for determining a resource configuration for a sidelink discovery signal. The resource configuration provides one or more parameters for transmitting the sidelink discovery signal. The method also provides for measuring link quality between the UE and at least one candidate relay UE. Based on the measured link quality one of the candidate relay UEs is selected and serves as a relay UE.

15 Claims, 10 Drawing Sheets

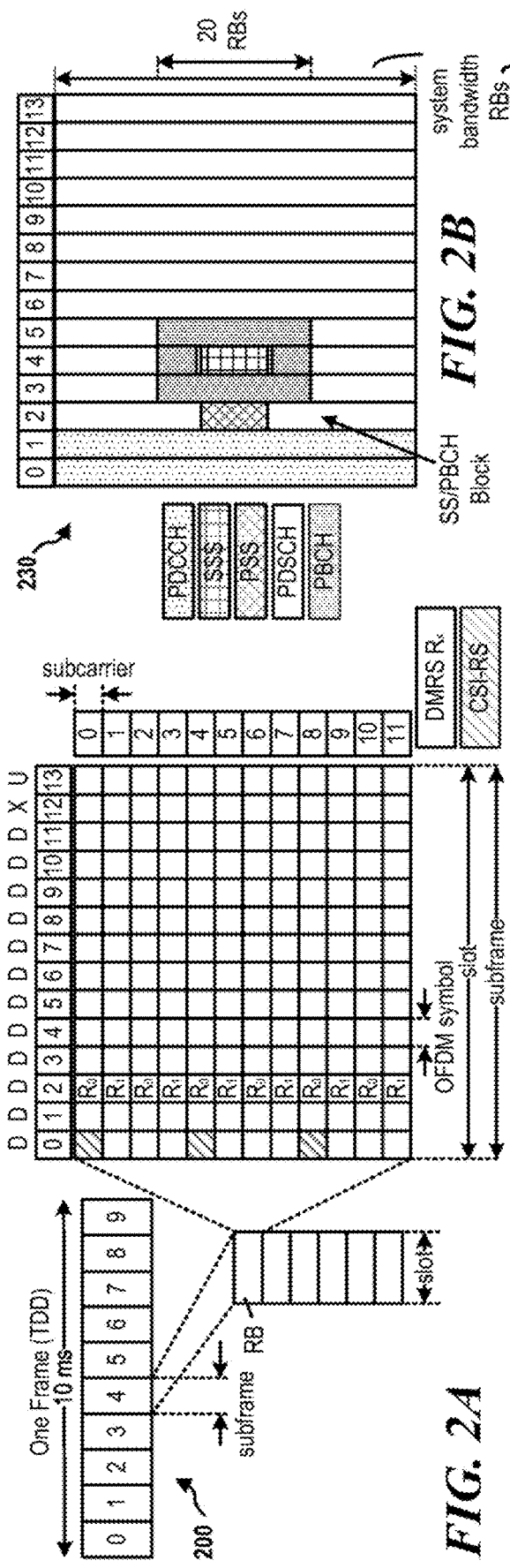
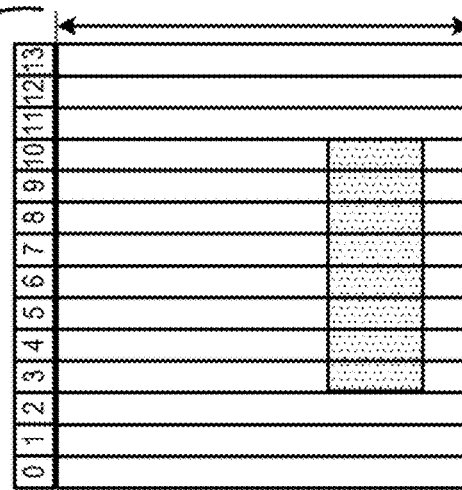
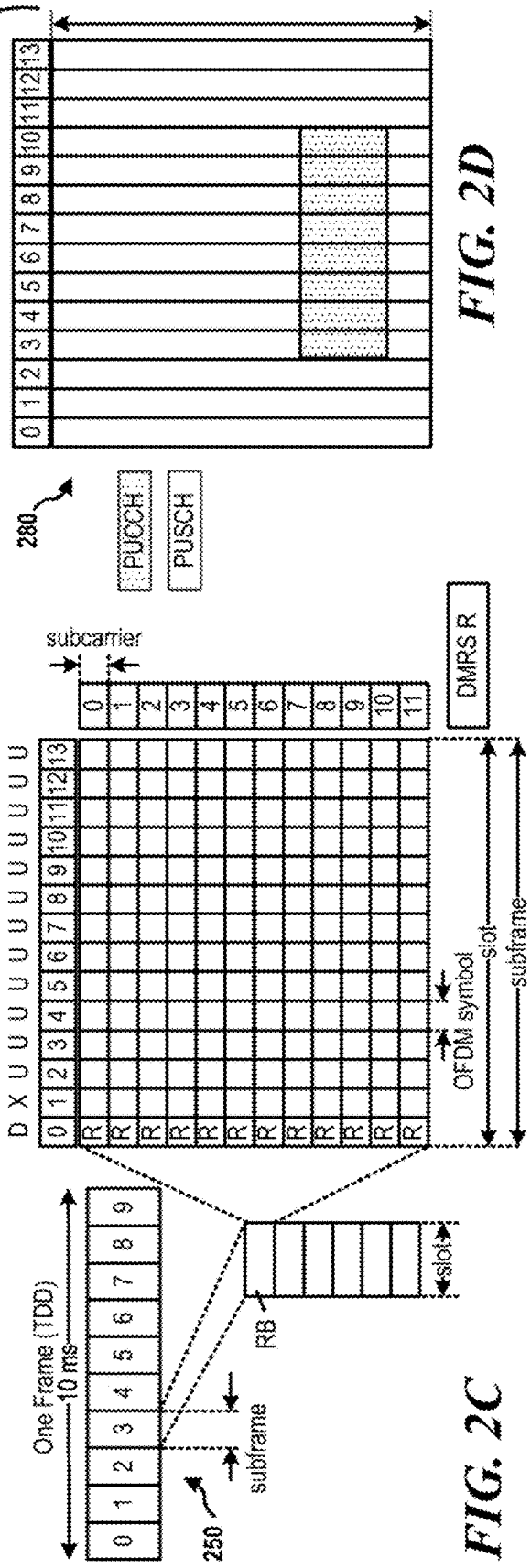
FIG. 2A
FIG. 2B
FIG. 2C
FIG. 2D

SIDELINK RADIO RESOURCE MANAGEMENT USING SIDELINK DISCOVERY SIGNAL

FIELD OF THE DISCLOSURE

Aspects of the present disclosure generally relate to wireless communications, and more particularly to techniques and apparatuses for sidelink radio resource management using the sidelink discovery signal.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (e.g., cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipments (UEs), such as vehicles, may communicate directly with each other using device-to-device (D2D) communications over a D2D wireless link. These communications can be referred to as sidelink communications.

As the demands for sidelink communications increase, the need for relay assistance may also increase. For example, a remote user equipment (UE) may choose to communicate with a network device, such as a base station, or gNodeB (gNB), but the link between the gNB and the remote UE may be weak. In such a situation, the remote UE may connect to the gNB via another UE, which may be known as a relay UE. In order to connect to the gNB using a relay, the remote UE determines which UE should serve as the relay. With the increasing use of sidelink communications, multiple candidate UEs may serve as a relay and may be selected in the event the connection with the original relay UE breaks. There is a need to improve relay selection.

SUMMARY

Aspects of the disclosure include a method of wireless communication by a user equipment (UE). The method includes determining a resource configuration for a sidelink discovery signal. The resource configuration includes one or parameters for the sidelink discovery signal. In addition, the method provides for measuring link quality on at least one link between the UE and at least one candidate UE based on a discovery signal received from the at least one candidate UE according to the one or more parameters.

Further aspects of the disclosure provide a method of wireless communication for a user equipment (UE). The method comprises determining a resource configuration for a sidelink discovery signal. The resource configuration includes one or more parameters for transmitting the sidelink discovery signal. The method also includes transmitting the sidelink discovery signal to a remote sidelink UE based at least partially on the one or more parameters for the sidelink discovery signal.

In a further aspect of the disclosure, an apparatus for wireless communication by a user equipment (UE) includes at least one processor that is coupled to a memory and configured to determine a resource configuration for a sidelink discovery signal. The resource configuration includes one or more parameters for transmitting the sidelink discovery signal. The processor(s) is further configured to measure link quality on at least one link between the UE and at least one candidate UE based on a discovery signal received from the at least one candidate UE according to the one or more parameters.

A still further aspect of the disclosure provides an apparatus for wireless communication by a sidelink user equipment (UE). The apparatus includes at least one processor coupled to a memory configured to determine a resource configuration for a sidelink discovery signal. The resource configuration includes one or more parameters for transmitting the sidelink discovery signal. The processor(s) is further configured to transmit the sidelink discovery signal to a remote sidelink UE based on the one or more parameters.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

DETAILED DESCRIPTION

Figure 1:
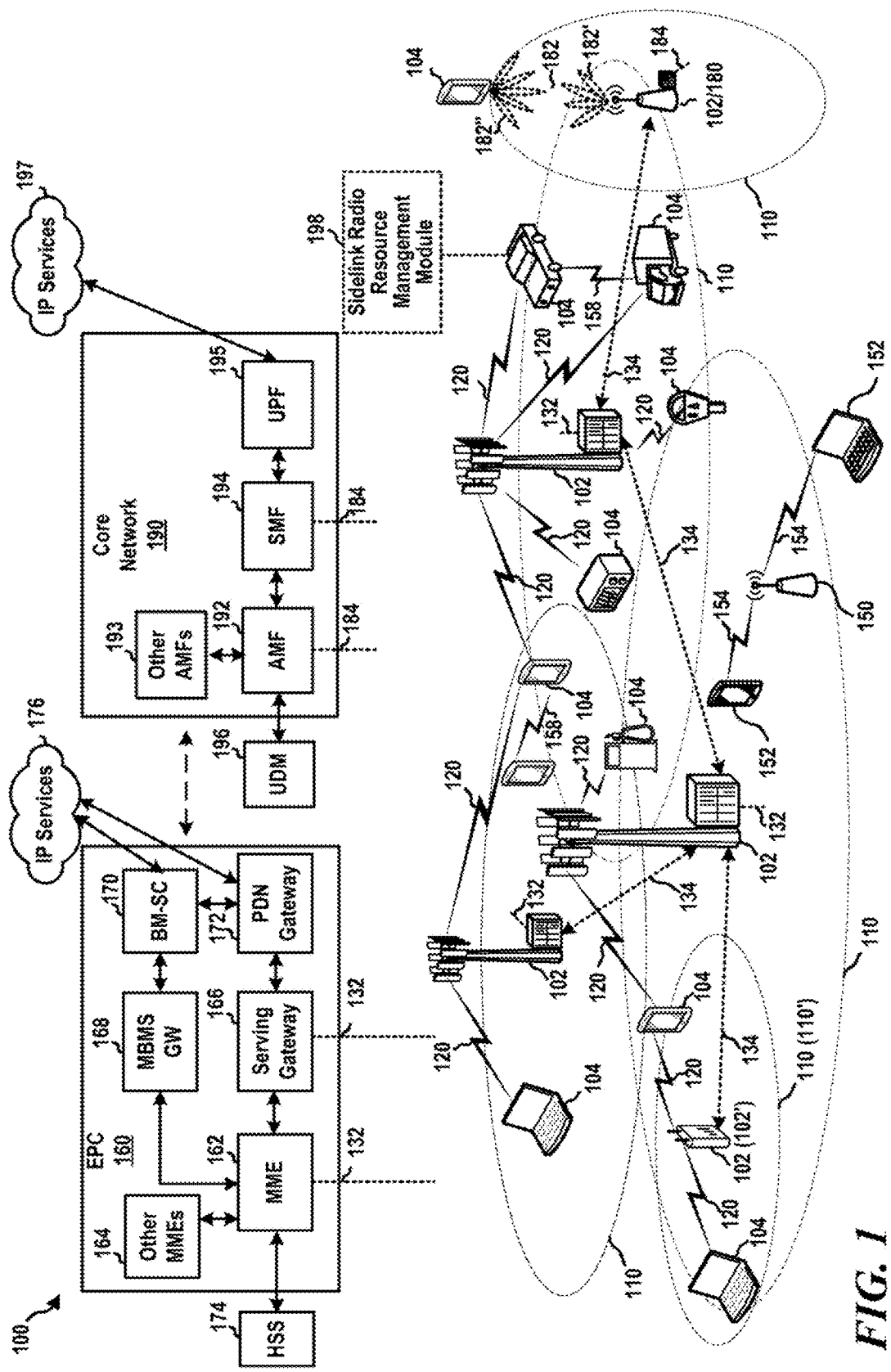
FIG. 1 is a diagram illustrating an example of a wireless communications system and an access network.

Various aspects of the present disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the present disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the present disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UE) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSCCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial Internet of Things (IoT) (IIoT), and/or new radio (NR)-lite. In addition, in sidelink communication the PSSCH may be transmitted with one or two multiple-input multiple-output layers (MIMO), based on the channel condition. Using the MIMO layers may be at the discretion of the transmitting UE.

As the demands for sidelink communications increase, the need for relay assistance may also increase. For example, a remote user equipment (UE) may want to communicate with a base station, or gNodeB (gNB), but the link between the gNB and the remote UE may be too weak. In such a situation, the remote UE may connect to the gNB via another UE, which may be referred to as a relay UE. In order to connect to the gNB via a relay, the remote UE determines which candidate UE should serve as the relay. In some cases, multiple candidate UEs may serve as relays. The remote UE may monitor the link quality for the channel between the remote UE and the relay UE, for example with a discovery channel, to determine the channel quality between the remote UE and each relay UE of the multiple candidate relay UEs.

Aspects of the present disclosure are directed to a UE configured or pre-configured with physical layer transmission parameters, such as resource blocks (RBs) or subchannels, and/or a modulation and coding scheme (MCS) for transmitting on a sidelink discovery channel. This configuration allows all candidate relay UEs to use the same bandwidth and/or MCS to transmit the discovery signal. As a result, the reference signal receive power (RSRP) measured for the discovery signal transmission may be a proxy for an actual link quality between the remote UE and a candidate relay UE.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the evolved packet core (EPC) 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL, WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth®, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz to 300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The evolved packet core (EPC) 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink device, such as the user equipment (UE) 104, may include a sidelink radio resource management module 198 configured to provide sidelink radio resource management using a sidelink discovery signal. The sidelink radio resource management module 198 may also assist with relay selection and radio resource management activities using the sidelink discovery signal, as described below.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which, for a particular set of subcarriers (carrier system bandwidth), subframes within the set of subcarriers are dedicated for either DL or UL, or may be time division duplex (TDD) in which, for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries downlink control information (DCI) within one or more control channel elements (CCEs), each CCE including nine resource element groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned demodulation reference signal (DM-RS). The physical broadcast channel (PBCH), which carries a master information block (MIB), may be logically grouped with the PSS and SSS to form a synchronization signal (SS)/PBCH block. The MIB provides a number of resource blocks (RBs) in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The physical uplink control channel (PUCCH) may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement/negative-acknowledgement (ACK/NACK) feedback. The physical uplink shared channel (PUSCH) carries data, and may additionally be used to carry a buffer status report (BSR), a power headroom report (PHR), and/or uplink control information (UCI).

Figure 3:
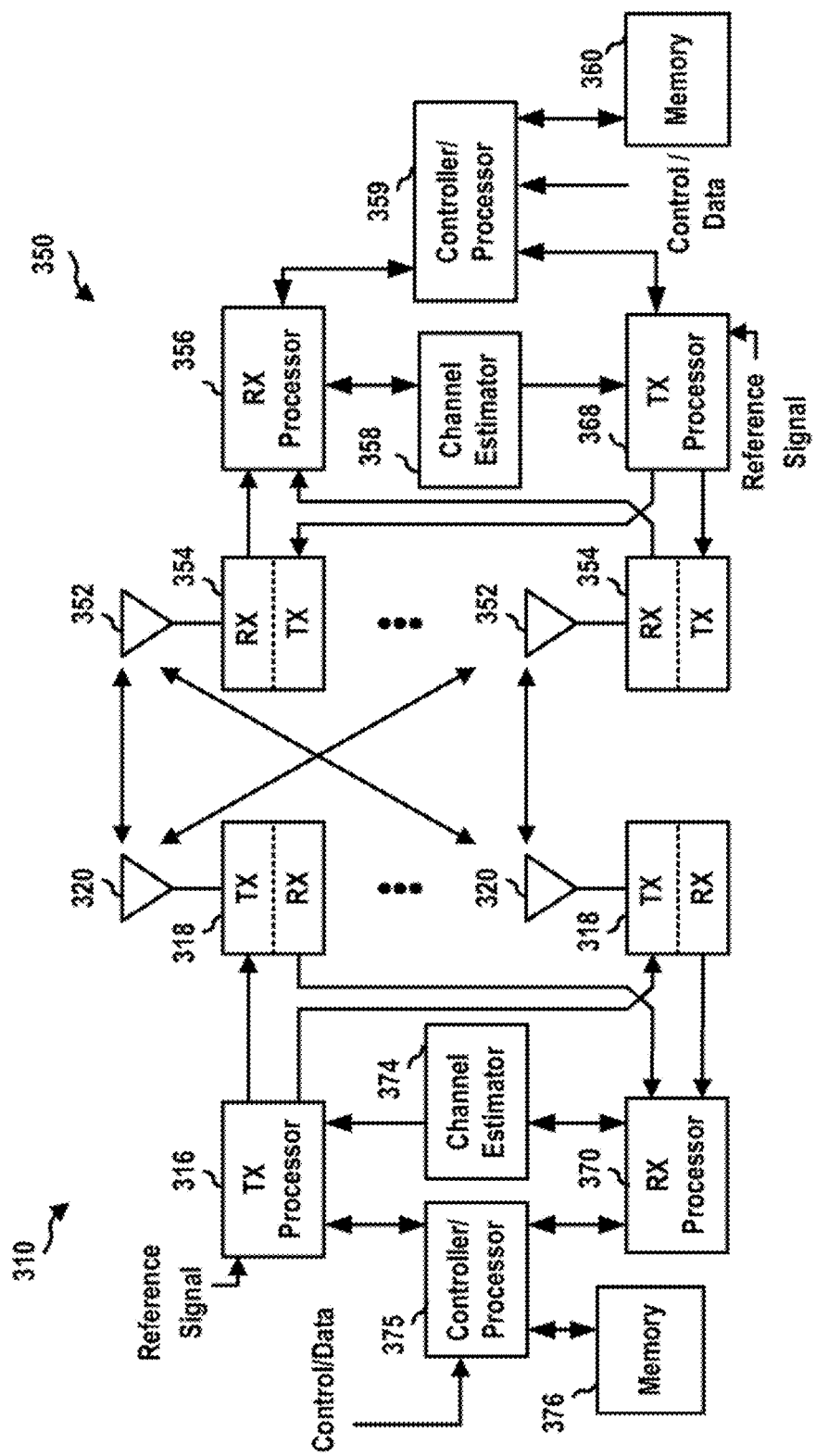
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets from the evolved packet core (EPC) 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from transport blocks (TBs), scheduling information reporting, error correction through hybrid automatic repeat request (HARQ), priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink radio resource management module 198 of FIG. 1. In some aspects, the UE 350 may include means for determining a resource configuration, means for measuring link quality on at least one link, and means for selecting a relay UE. The UE 350 may also include means for transmitting the sidelink discovery signal, and means for serving as a relay UE. Such means may include one or more of the components of the UE 350 described with reference to FIG. 3.

Figure 4:
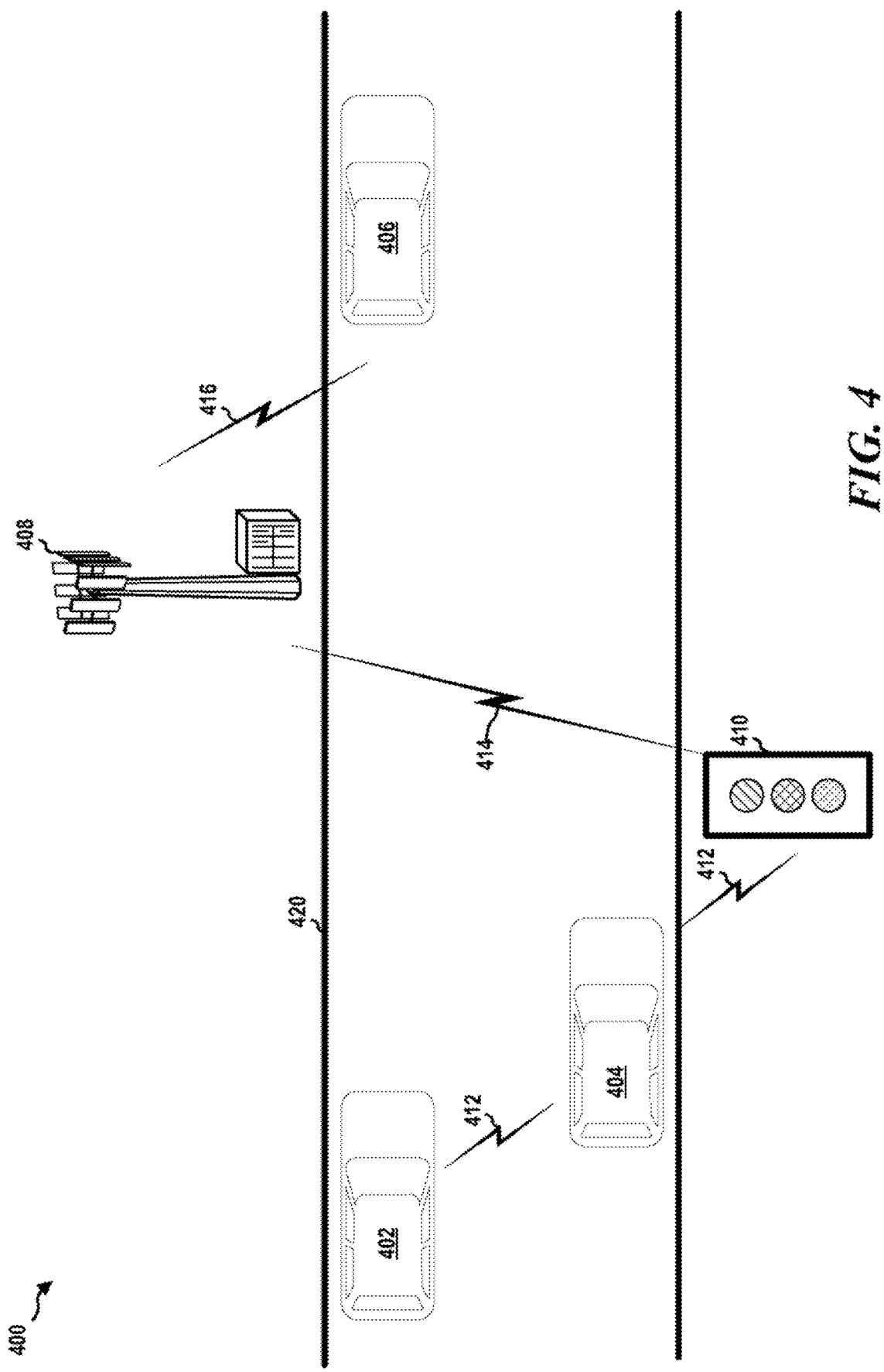
FIG. 4 is a block diagram illustrating an example of a vehicle-to-everything (V2X) system with a road side unit (RSU), according to aspects of the present disclosure.

FIG. 4 illustrates an example of a vehicle-to-everything (V2X) system 400 with a road side unit (RSU), according to aspects of the present disclosure. As shown in FIG. 4, a V2X system 400 includes a transmitter UE 404 transmits data to an RSU 410 and a receiving UE 402 via sidelink transmissions 412. Additionally, or alternatively, the RSU 410 may transmit data to the transmitter UE 404 via a sidelink transmission 412. The RSU 410 may forward data received from the transmitter UE 404 to a cellular network (e.g., gNB) 408 via an UL transmission 414. The gNB 408 may transmit the data received from the RSU 410 to other UEs 406 via a DL transmission 416. The RSU 410 may be incorporated with traffic infrastructure (e.g., traffic light, light pole, etc.). For example, as shown in FIG. 4, the RSU 410 is a traffic signal positioned at a side of a road 420. Additionally or alternatively, RSUs 410 may be stand-alone units.

Figure 5:
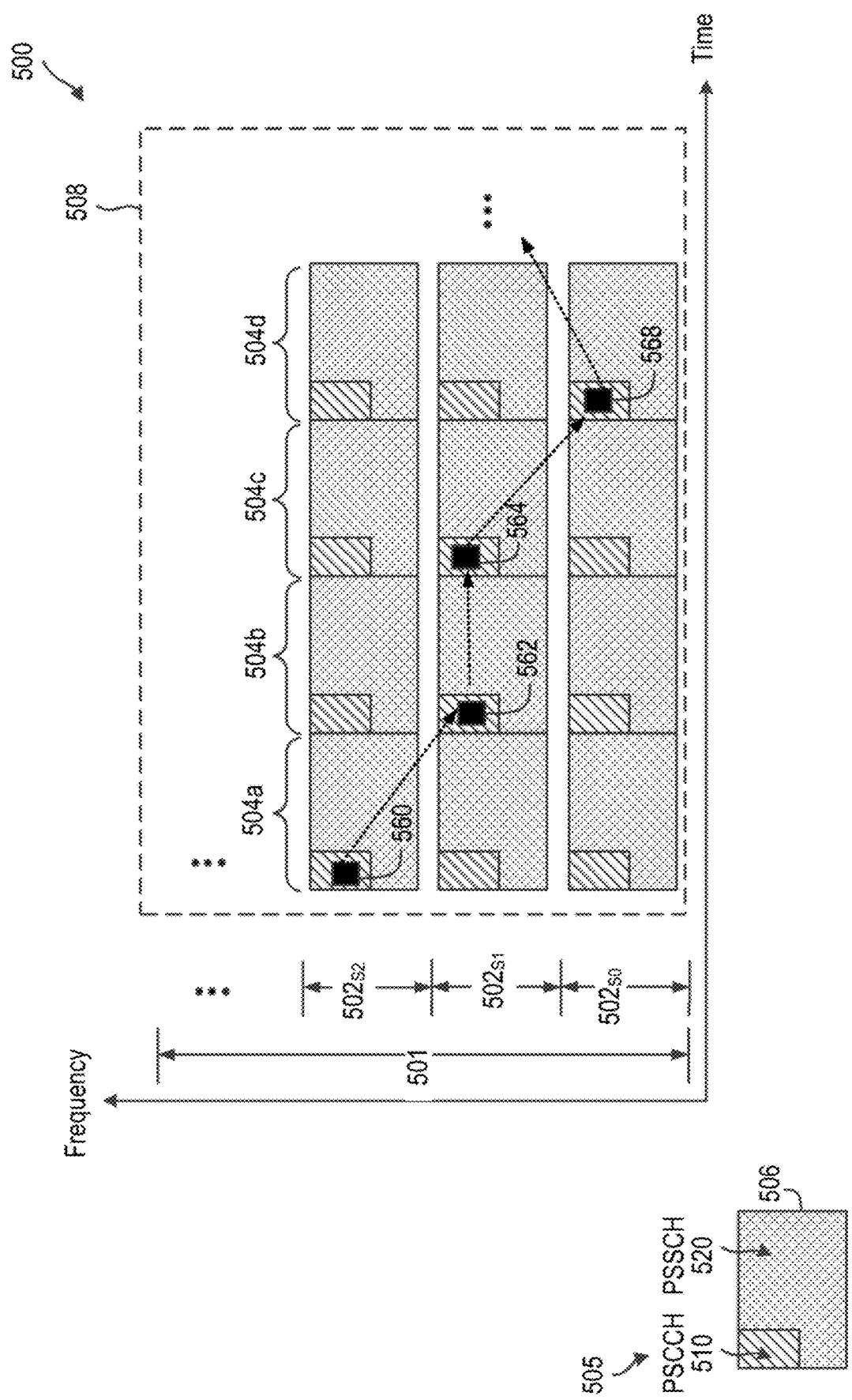
FIG. 5 is a graph illustrating a sidelink (SL) communications scheme, in accordance with various aspects of the present disclosure.

FIG. 5 is a graph illustrating a sidelink (SL) communications scheme in accordance with various aspects of the present disclosure. The scheme 500 may be employed by UEs such as the UEs 104 in a network such as the network 100. In FIG. 5, the x-axis represents time and the y-axis represents frequency.

In the scheme 500, a shared radio frequency band 501 is partitioned into multiple subchannels or frequency subbands 502 (shown as $502_{S0}$, $502_{S1}$, $502_{S2}$) in frequency and multiple sidelink frames 504 (shown as 504a, 504b, 504c, 504d) in time for sidelink communications. The frequency band 501 may be at any suitable frequencies. The frequency band 501 may have any suitable bandwidth (BW) and may be partitioned into any suitable number of frequency subbands 502. The number of frequency subbands 502 can be dependent on the sidelink communications BW requirement.

Each sidelink frame 504 includes a sidelink resource 506 in each frequency subband 502. A legend 505 indicates the types of sidelink channels within a sidelink resource 506. In some instances, a frequency gap or guard band may be specified between adjacent frequency subbands 502, for example, to mitigate adjacent band interference. The sidelink resource 506 may have a substantially similar structure as an NR sidelink resource. For instance, the sidelink resource 506 may include a number of subcarriers or RBs in frequency and a number of symbols in time. In some instances, the sidelink resource 506 may have a duration between about one millisecond (ms) to about 20 ms. Each sidelink resource 506 may include a PSCCH 510 and a PSSCH 520. The PSCCH 510 and the PSSCH 520 can be multiplexed in time and/or frequency. In the example of FIG. 5, for each sidelink resource 506, the PSCCH 510 is located during the beginning symbol(s) of the sidelink resource 506 and occupies a portion of a corresponding frequency subband 502, and the PSSCH 520 occupies the remaining time-frequency resources in the sidelink resource 506. In some instances, a sidelink resource 506 may also include a physical sidelink feedback channel (PSFCH), for example, located during the ending symbol(s) of the sidelink resource 506. In general, a PSCCH 510, a PSSCH 520, and/or a PSFCH may be multiplexed within a sidelink resource 506.

The PSCCH 510 may carry SCI 560 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 506.

In an NR sidelink frame structure, the sidelink frames 504 in a resource pool 508 may be contiguous in time. A sidelink UE (e.g., the UEs 104) may include, in SCI 560, a reservation for a sidelink resource 506 in a later sidelink frame 504. Thus, another sidelink UE (e.g., a UE in the same NR-U sidelink system) may perform SCI sensing in the resource pool 508 to determine whether a sidelink resource 506 is available or occupied. For instance, if the sidelink UE detected SCI indicating a reservation for a sidelink resource 506, the sidelink UE may refrain from transmitting in the reserved sidelink resource 506. If the sidelink UE determines that there is no reservation detected for a sidelink resource 506, the sidelink UE may transmit in the sidelink resource 506. As such, SCI sensing can assist a UE in identifying a target frequency subband 502 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 502 in one sidelink frame 504 to another frequency subband 502 in another sidelink frame 504. In the illustrated example of FIG. 5, during the sidelink frame 504a, the sidelink UE transmits SCI 560 in the sidelink resource 506 located in the frequency subband $502_{S2}$ to reserve a sidelink resource 506 in a next sidelink frame 504b located at the frequency subband $502_{S1}$. Similarly, during the sidelink frame 504b, the sidelink UE transmits SCI 562 in the sidelink resource 506 located in the frequency subband $502_{S1}$ to reserve a sidelink resource 506 in a next sidelink frame 504c located at the frequency subband $502_{S1}$. During the sidelink frame 504c, the sidelink UE transmits SCI 564 in the sidelink resource 506 located in the frequency subband $502_{S1}$ to reserve a sidelink resource 506 in a next sidelink frame 504d located at the frequency subband $502_{S0}$. During the sidelink frame 504d, the sidelink UE transmits SCI 568 in the sidelink resource 506 located in the frequency subband $502_{S0}$. The SCI 568 may reserve a sidelink resource 506 in a later sidelink frame 504.

The SCI can also indicate scheduling information and/or a destination identifier (ID) identifying a target receiving sidelink UE for the next sidelink resource 506. Thus, a sidelink UE may monitor SCI transmitted by other sidelink UEs. Upon detecting SCI in a sidelink resource 506, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 504 in different frequency subband (e.g., via frequency division multiplexing (FDM)). For instance, in the sidelink frame 504b, one pair of sidelink UEs may communicate sidelink data using a sidelink resource 506 in the frequency subband $502_{S2}$ while another pair of sidelink UEs may communicate sidelink data using a sidelink resource 506 in the frequency subband $502_{S1}$.

In some aspects, the scheme 500 is used for synchronous sidelink communications. That is, the sidelink UEs may be synchronized in time and are aligned in terms of symbol boundary, sidelink resource boundary (e.g., the starting time of sidelink frames 504). The sidelink UEs may perform synchronization in a variety of forms, for example, based on sidelink synchronization signal blocks (SSBs) received from a sidelink UE and/or NR-U SSBs received from a BS (e.g., the BSs 105 and/or 205) while in-coverage of the BS. In some aspects, the sidelink UE may be pre-configured with the resource pool 508 in the frequency band 501, for example, while in coverage of a serving BS. The resource pool 508 may include a plurality of sidelink resources 506. The BS can configure the sidelink UE with a resource pool configuration indicating resources in the frequency band 501 and/or the subbands 502 and/or timing information associated with the sidelink frames 504. In some aspects, the scheme 500 includes mode-2 RRA (e.g., supporting autonomous radio resource allocation (RRA) that can be used for out-of-coverage sidelink UEs or partial-coverage sidelink UEs).

Sidelink communication was introduced in LTE Release 12 and was later improved for vehicle-to-everything (V2X) applications in LTE Release 14 and Release 15. Sidelink generally refers to UEs communicating directly with one another, that is, without routing through a network device, such as a base station. The sidelinks themselves may be referred to as PC5 interfaces. In New Radio (NR) Release 16, V2X communication using sidelink was introduced with several design changes from the earlier LTE sidelink procedures. In NR Release 16, one UE may discover another UE via a discovery procedure. This discovery procedure occurs at a higher layer of the protocol stack, for example, at the application layer.

Further refinements of the discovery procedure are contemplated for NR Release 17 and higher. These refinements of the discovery procedure implement the discovery mechanism at a lower layer of the protocol stack, such as the media access control (MAC) layer or the physical (PHY) layer. Implementing the discovery procedure at a lower layer of the protocol stack may provide power saving, such as with relay applications. As described above, in a relay application, a relay UE may serve as a relay between a remote UE and a base station. The remote UE is within range of the relay UE, and the relay UE is within range of the base station.

In some cases, UEs may locate other UEs within range by transmitting discovery signals, for example, over a discovery channel or a data channel, such as a physical sidelink shared channel (PSSCH). The discovery signal may be a sidelink communications channel. As an example, a remote UE may use the discovery signal to perform radio resource management (RRM) measurements for relay selection and handover. The RRM measurements, however, depend on physical layer transmission parameters, such as bandwidth carrying a discovery signal and a modulation and coding scheme (MCS) associated with the discovery signal. To improve consistency of the RRM measurements across devices, for example, during the selection of relay UEs, a sidelink UE may use a sidelink radio resource management module, such as the sidelink radio resource management module 198, described above in connection with FIG. 1. The sidelink radio resource management module 198 configures physical layer transmission parameters for the transmission of the sidelink discovery signal to assist with RRM measurement.

Figure 6:
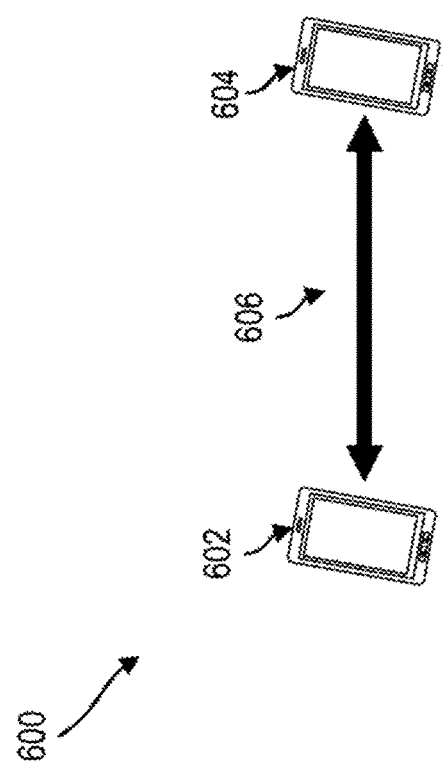
FIG. 6 is a diagram illustrating sidelink (SL) communication, in accordance with various aspects of the present disclosure.

FIG. 6 is a diagram illustrating sidelink (SL) communication, in accordance with various aspects of the disclosure. In FIG. 6, a sidelink communication session 600 is occurring between a first UE 602 and a second UE 604. A sidelink communication signal 606 is exchanged directly between the first UE 602 and the second UE 604. That is, the sidelink communication signal 606 bypasses a base station, such that the base station is not involved in the sidelink communication session 600.

To improve an accuracy of link quality measurements for the sidelink communication signal 606, the first UE 602 and the second UE 604 may perform signal measurements based on the same physical layer transmission characteristics. For example, measurements may be based on signals sent across the same bandwidth with the same MCS. Measuring link quality may refer to measuring parameters indicative of link quality, for example, measurements that indicate a received signal strength and/or received signal quality for the link. As an example, link quality may be measured using received signal receive power (RSRP). In some implementations, the downlink reference signal receive power (DL-RSRP) may be used as a proxy for the link quality. Other measurements or parameters of link quality may also be used. According to aspects of the present disclosure, each UE may transmit a discovery signal at a configured bandwidth and MCS to facilitate use of the discovery signal for sidelink radio resource management (RRM). RRM refers to resource management for mobility operations such as relay selection and handover. RRM includes signal quality and signal strength measurements.

Figure 7:
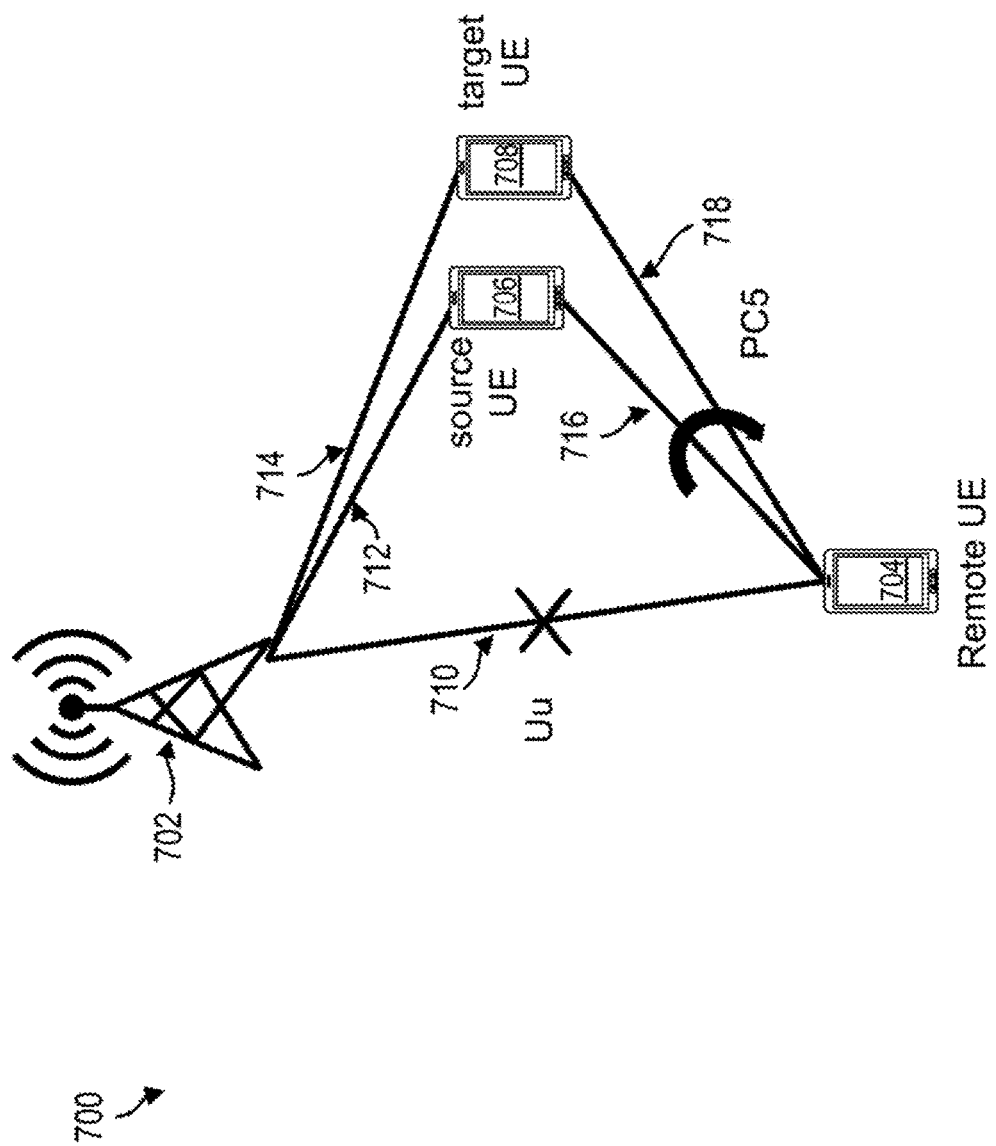
FIG. 7 is a diagram illustrating relay selection and handover, in accordance with aspects of the present disclosure.

FIG. 7 is a diagram illustrating relay selection and handover, in accordance with various aspects of the disclosure. In FIG. 7, a sidelink relay communication session 700 is depicted. The network, including a base station or gNodeB (gNB) 702 is not in communication with a remote UE 704. The base station 702 is in communication with two candidate UEs 706 and 708. From the perspective of the remote UE 704 during a sidelink handover procedure, the two candidate UEs 706 and 708 may be defined as a source relay and a destination relay 8. The remote UE 704 may handover from the candidate UE 706 to another candidate UE 708. From the perspective of the gNB 702 in FIG. 7, there are two candidate UEs 706 and 708 that may serve as potential relay UEs for other UEs. In a sidelink relay selection procedure, the remote UE 704 may handover from the candidate UE 706, serving as the source relay UE, to the candidate UE 708, serving as the destination relay. As an example, the remote UE 704 may not communicate with the gNB 702 because a signal strength or signal quality of a Uu link 710 may be below a threshold. The Uu link 710 may be referred to as a Uu interface. The Uu link 710 is the radio interface between a UE and a radio access network (RAN). Because the remote UE 704 may not connect to the gNB 702 via the Uu link 710, the remote UE 704 connects to the gNB 702 via another UE, referred to as a relay, across remote UE relay links 716 and 718. Relay technology may provide direct communication in areas within network coverage, where a gNB could coordinate resource allocation. In addition, relay technology may enable out of coverage UEs to communicate using the sidelink, in which case autonomous resources may be selected based on pre-configured parameters.

Relay functionality allows in-coverage candidate UEs 706, 708 to act as network relays, redirecting traffic to and from the remote UE 704. In order to reach the base station 702 through a relay, the remote UE 704 searches for candidate UEs 706, 708 in proximity using a direct discovery procedure. The remote UE 704 then selects the most suitable relay UE, when multiple candidates are available, and connects to the selected relay UE using direct one-to-one communications.

In order to connect to the gNB 702 via a relay, the remote UE 704 determines which candidate UEs 706, 708 to use as a relay. As shown in FIG. 7, the candidate UE 706 and the candidate UE 708 may be suitable for serving as a relay link. In one example, the remote UE 704 monitors the link quality of the channel between the remote UE 704 and each candidate UE 706, 708. As an example, if a strength of the link between the remote UE 704 and a candidate UE 706, 708 is less than a link strength threshold, the remote UE 704 may select another UE, such as the candidate UE 708, to serve as a relay link. In this example, the remote UE 704 may handover from the candidate UE 706 to the candidate UE 708.

To determine link quality between the remote UE 704 and the candidate UEs 706 and 708, the remote UE 704 may transmit or receive discovery signals. In some aspects, the discovery signals may be transmitted via a physical sidelink shared channel (PSSCH). The PSSCH may be used in sidelink communication to transmit and receive data packets between sidelink UEs. In other aspects, the discovery signals may be transmitted via a dedicated discovery channel, in which case there is no link adaptation for the discovery channel.

If there is no coordination among the candidate UEs 706, 708, each candidate UE 706, 708 may determine a transmission bandwidth and MCS for the discovery signal. Different candidate relays, such as candidate UEs 706 and 708, may use different parameters, including bandwidth and modulation and coding scheme (MCS), to transmit the discovery signal. As a result, it may be difficult for the remote UE 704 to determine a true quality of the link. This issue may be unique to sidelink communication. For example, in cellular communication, gNBs are coordinated and transmit at a fixed power with a fixed bandwidth for the synchronization signal block (SSB) signal, which the UE measures for signal quality calculations. As a result, the downlink (DL) reference signal receive power (RSRP) may be a good proxy for the link quality in Uu communications. Other link quality measurements may also be used.

In FIG. 7, the remote UE 704 may initially use the candidate UE 706 as a relay link to connect to the gNB 702. When the candidate UE 706 serves as the relay link, it communicates with the gNB 702 using the relay UE-to-gNB link 712. The candidate UE 706 uses a relay UE-to-remote UE relay link 716 to relay information from the gNB 702. If this remote UE relay link 716 fails, the remote UE 704 may shift to using the candidate UE 708 as a relay. In this case, the candidate UE 708 communicates with the gNB 702 using a relay UE-to-gNB link 714. The remote UE 704 communicates with the candidate UE 708 using the relay UE-to-remote UE relay link 718 and is able to relay communications with the gNB 702.

When the remote UE 704 measures the channel quality between the remote UE 704 and the candidate UE 706, the remote UE 704 may use the discovery signal from the candidate UE 706. The remote UE 704 measures the sidelink (SL) reference signal received power (RSRP) of each resource element (RE). The RSRP is the received power of a signal measured at a receiver, in this case, the remote UE 704.

The per-resource element RSRP may not be a good metric for determining link quality, particularly when the candidate UEs 706, 708 transmit their discovery signals using different per-resource element transmit power. In one example, the path loss from the two candidate UEs 706, 708 to the remote UE 704 may be the same. For example, the two candidate UEs 706, 708 may both transmit at maximum power (e.g., 23 dBm). In this example, the candidate UE 706 may use double resource blocks (RBs) to transmit the discovery signal, while the candidate UE 708 uses a single resource block to transmit the discovery signal. In this example, the measured RSRP at the remote UE 704 for the candidate UE 708 is twice the RSRP measured for the candidate UE 706, because the per RE transmit power from the candidate UE 708 is double the per-RE transmit power from the candidate UE 706. Thus, when different UEs select different transmission parameters, it may be difficult for a UE to accurately estimate link quality.

Aspects of the present disclosure are directed to a UE configured or pre-configured with resource blocks (RBs) or subchannels, and/or an MCS for transmitting a sidelink discovery. In addition, the UE may transmit the sidelink discovery signal using a single multiple-input multiple-output (MIMO) layer. The UE may also transmit the sidelink discovery signal using a single demodulation reference signal (DMRS) port. This configuration allows all candidate UEs to use the same bandwidth and/or MCS to transmit the discovery signal. As a result, the RSRP measured for the discovery signal transmission is an accurate proxy for the actual link quality between the remote UE and a candidate relay UE.

The discovery signal may be transmitted in different ways. In one configuration, the discovery signal may be transmitted in a separate resource pool from the communication signal, for example, within a data payload. The resource pool may be a particular set of one or more resource blocks such that all of the resources need not be different. In other words, the discovery resources may overlap the communication time resources, but in a different frequency. When the discovery signal is transmitted in a separate resource pool, the number of RBs to transmit the discovery signal may be configured or pre-configured via the discovery resource pool configuration. This may occur by configuring the subchannel size and/or the number of subchannels for each discovery transmission. In another configuration, the MCS for the sidelink discovery signal may be configured for the discovery resource pool by setting a minimum MCS equal to a maximum MCS. For example, the radio resource control (RRC) parameter SL-MinMaxMCS-Config may be set in such a manner. The UE may identify whether a transmission is associated with the discovery message or a communication message. This identification may be based on the logical channels used for the message.

A UE may be configured with multiple logical channels in the upper layer. Communication messages and discovery messages may be assigned to different logical channels. Based on the logical channel a message is assigned to, the physical layer of the UE may identify whether a message is a communication message or a discovery message. The UE may be a transmitting UE or a receiving UE. Each PSSCH transmission using sidelink communications contains a medium access control (MAC) sub-header. The MAC sub-header includes the logical channel identifier (LCID) of the logical channel associated with the payload of the PSSCH transmission.

The LCID field identifies the logical channel instance or the type of the corresponding MAC control element (MAC CE) within the scope of one Source Layer-2 ID and Destination Layer-2 ID pair of the corresponding MAC SDU (service data unit) or padding. There is one LCID field per MAC sub-header except for the sidelink shared channel (SL-SCH) sub-header. The LCID may take the values given in the table below.

Values of LCID for SL-SCH

| Index | LCID Value |
| --- | --- |
| 0 | SCCH carrying PC5-S messages that are not protected |
| 1 | SCCH carrying PC5-S messages "Direct Security Mode Command" and "Direct Security Mode Complete |
| 2 | SCCH carrying other PC5-S messages that are protected |
| 3 | SCCH carrying PC5-RRC messages |
| 4-19 | Identity of the logical channel |
| 20-61 | Reserved |
| 62 | Sidelink CSI reporting |
| 63 | Padding |

In another configuration, the discovery signal may be transmitted in the same resource pool as other communication signals. In one example, a separate set of RRC parameters may be configured or pre-configured in the UE for transmitting the discovery signal over the identified resource pool. The parameters that may be configured include the number of subchannels for each discovery transmission and/or the MCS for discovery signal transmission. In one example, the subchannel size may be the same for both the communication signal and the discovery signal. As with the separate resource pools, the UE may identify whether a transmission is associated with the discovery message or a communication message. This identification may be based on the logical channels used for the message.

As indicated above FIGS. 6 and 7 are provided as examples. Other examples may differ from what is described with respect to FIGS. 6 and 7.

Figure 8:
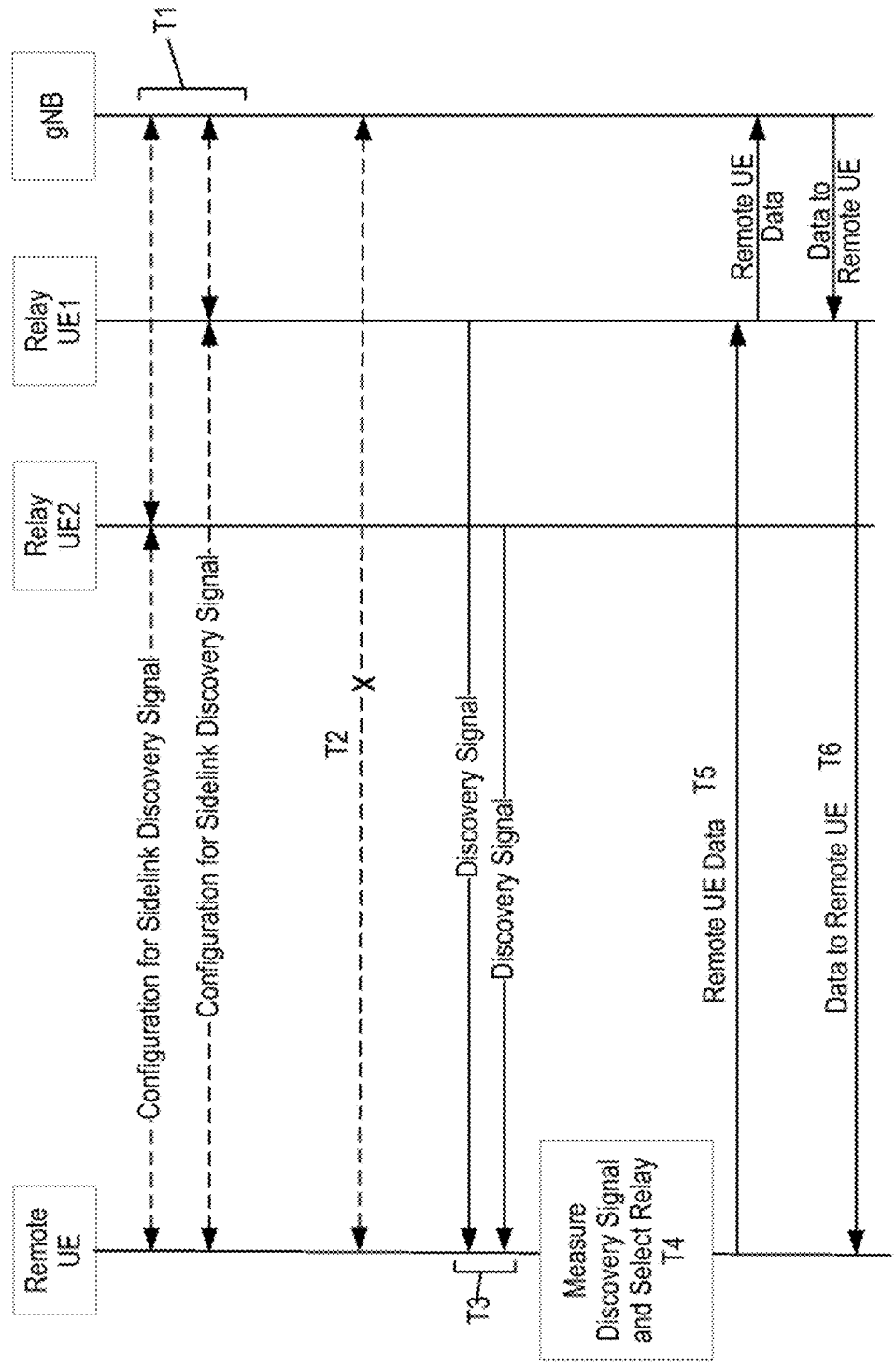
FIG. 8 is a timing diagram illustrating link quality measurement and relay selection by a sidelink user equipment (UE), in accordance with aspects of the present disclosure.

FIG. 8 is a timing diagram illustrating link quality measurement and relay selection by a sidelink user equipment (UE), in accordance with aspects of the present disclosure. The call flow diagram begins at time T1 with relay UE1 and relay UE2 in communication with a network (e.g., a gNB). From the perspective of the remote UE, the sidelink discovery parameters may be pre-configured in the UE during manufacturing. This pre-configuring may occur prior to time T1. Alternatively, the parameters may be configured in the UE while in the coverage area of the base station or gNB. The UE may also initiate the relay discovery procedure if it moves out of the coverage area of the base station or gNB. In such instances, the configuration may occur prior to or at time T1. For ease of illustration, FIG. 8 shows discovery parameter configuration at time T1.

At time T2, a remote UE is unable to communicate with the gNB, which may occur because the link between the remote UE and the gNB is weak (e.g., a signal strength is less than a signal strength threshold).

At time T3, the remote UE monitors for discovery signals from the relay UE1 and relay UE2. The discovery signals may be transmitted in a separate resource pool from the communication signal or may be in the same resource pool as the communication signal. When the discovery signal is transmitted in a separate resource pool, the number of resource blocks (RBs) used to transmit the discovery signal may be configured using the discovery resource pool configuration. The MCS used for transmission of the sidelink discovery signal may also be configured for the discovery resource pool configuration, for example, by setting the minimum MCS equal to the maximum MCS. When the discovery signal is transmitted in the common or same resource pool, a set of separate RRC parameters may be configured in the UE for transmitting the discovery signal over the identified resource pool, including the number of subchannels for each discovery signal transmission and/or the MCS for discovery transmission.

At time T4, the remote UE measures the signal strength of the discovery signals received from the candidate UEs, which may serve as relays (e.g., relay UE1 and relay UE2), which indicates the link quality, and selects a relay from the candidate UEs, based at least partially on the measured link quality, for communicating with the gNB. In the example of FIG. 8, the remote UE selects relay UE1. At time T5, the remote UE sends data to the gNB via relay UE1. The gNB responds at time T6, transmitting data to relay UE1, which then relays the data to the remote UE.

Figure 9:
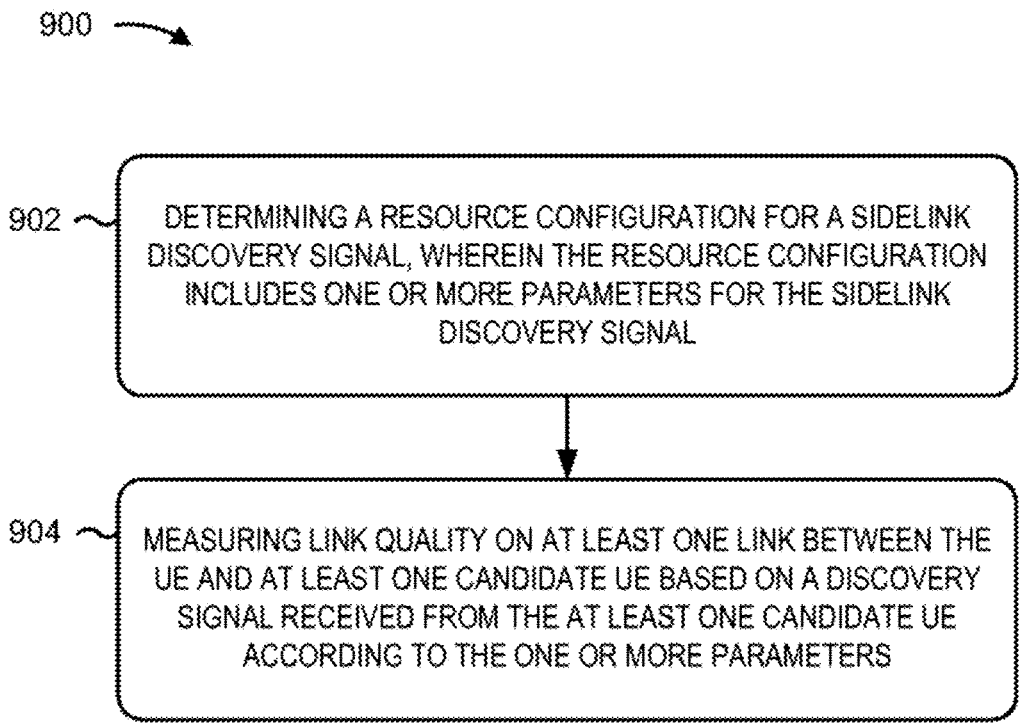
FIG. 9 is a flow diagram of a method of wireless communication for a user equipment (UE), in accordance with aspects of the present disclosure.

FIG. 9 is a flow diagram of a method 900 of wireless communication for a user equipment (UE), in accordance with aspects of the disclosure. The method 900 is an example of sidelink radio resource management using a sidelink discovery signal. The method 900 begins in block 902 with determining a resource configuration for a sidelink discovery signal. The resource configuration includes one or more parameters for the sidelink discovery signal. For example, the UE (e.g., using the antenna 352, RX 354, receive processor 356, controller/processor 359, memory 360, and or the like) can determine the resource configuration. The UE may receive the sidelink discovery signal from candidate UEs. The method continues in block 904 with measuring link quality on at least one link between the UE and at least one candidate UE based on a discovery signal received from the at least one candidate UE in accordance with the one or more parameters. For example, the UE (e.g., using the antenna 352, RX 354, receive processor 356, controller/processor 359, memory 360, and or the like) can measure the link quality.

Figure 10:
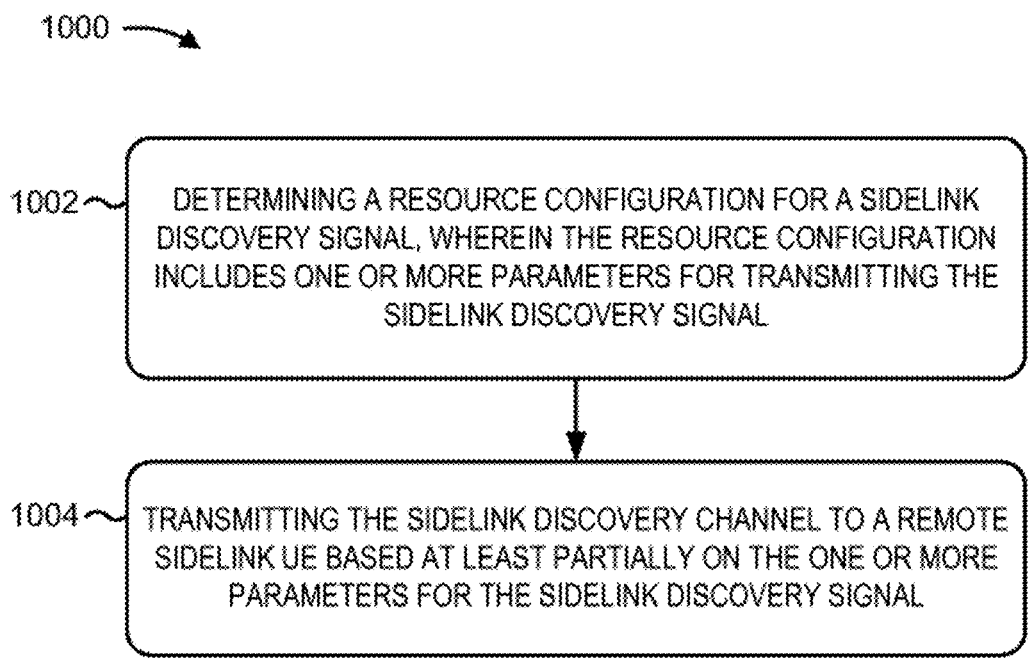
FIG. 10 is a flow diagram of another method of wireless communication for a user equipment (UE), in accordance with aspects of the present disclosure.

FIG. 10 is a flow diagram of another method 1000 of wireless communication for a user equipment (UE), in accordance with aspects of the disclosure. The method 1000 is an example of sidelink radio resource management using sidelink discovery signals. The method 1000 begins in block 1002 with determining a resource configuration for a sidelink discovery signal. The resource configuration includes one or more parameters for transmitting the sidelink discovery signal. For example, the UE (e.g., using the antenna 352, RX 354, receive processor 356, controller/processor 359, memory 360, and or the like) can determine the resource configuration. The method continues in block 1004 with transmitting the sidelink discovery signal to a remote sidelink UE based at least partially on one or more parameters for the sidelink discovery signal. For example, the UE (e.g., using the antenna 352, TX 354, transmit processor 368, controller/processor 359, memory 360, and or the like) can transmit the sidelink discovery signal.

Implementation examples are described in the following numbered clauses.

1. A method of wireless communication by a user equipment (UE), comprising: determining a resource configuration for a sidelink discovery signal, wherein the resource configuration includes one or more parameters for the sidelink discovery signal; and measuring link quality on at least one link between the UE and at least one candidate UE based on a received discovery signal received from the at least one candidate UE according to the one or more parameters.

2. The method of clause 1, wherein the at least one candidate UE comprises a plurality of candidate relay UEs, and further comprising selecting a relay UE from the plurality of candidate relay UEs based at least in part on the measured link quality.

3. The method of clause 1, further comprising identifying whether a received sidelink transmission is associated with a discovery message or a communication message.

4. The method of any of the preceding clauses, wherein the identifying is based on a logical channel associated with the received sidelink transmission.

5. The method of clause 1, wherein a resource pool for the discovery signal is separate from a resource pool for other communications.

6. The method of any of the preceding clauses, wherein the one or more parameters indicates a number of resource blocks (RBs) for the discovery signal.

7. The method of any of the preceding clauses, wherein the number of RBs is indicated as a subchannel size or a number of subchannels for each discovery signal.

8. The method of any of the preceding clauses, wherein the one or more parameters indicates a modulation and coding scheme (MCS) for the discovery signal.

9. The method of any of the preceding clauses, wherein the MCS is configured by setting a minimum MCS equal to a maximum MCS.

10. The method of clause 1, wherein a resource pool is common for the discovery signal and other communications.

11. The method of any of the preceding clauses, wherein the one or more parameters comprises a first set of radio resource control (RRC) parameters for the discovery signal and a second set of RRC parameters for the other communications.

12. The method of any of the preceding clauses, wherein the first set of RRC parameters indicates a number of subchannels for each discovery signal.

13. The method of any of the preceding clauses, wherein the first set of RRC parameters indicates a modulation and coding scheme (MCS) for the discovery signal.

14. The method of clause 1, further comprising receiving the sidelink discovery signal using a single multiple-input multiple-output (MIMO) layer.

15. A method of wireless communication for a user equipment (UE), comprising:
determining a resource configuration for a sidelink discovery signal, wherein the resource configuration includes one or more parameters for transmitting the sidelink discovery signal; and
transmitting the sidelink discovery signal to a remote sidelink UE based at least in part on the one or more parameters for the sidelink discovery signal.

16. The method of clause 15, wherein the remote sidelink UE comprises a plurality of candidate relay UEs, and further comprising selecting a relay UE from the plurality of candidate relay UEs based at least in part on the measured link quality.

17. The method of clause 15, wherein a resource pool for the discovery signal is separate from a resource pool for other communications.

18. The method of any of the preceding clauses, wherein the one or more parameters indicates a number of resource blocks (RBs) for transmitting the discovery signal.

19. The method of any of the preceding clauses, wherein the number of RBs is indicated as a subchannel size or a number of subchannels for each discovery signal transmission.

20. The method of any of the preceding clauses, wherein the one or more parameters indicates a modulation and coding scheme (MCS) for transmitting the discovery signal.

21. The method of any of the preceding clauses, wherein the MCS is configured by setting a minimum MCS equal to a maximum MCS.

22. The method of clause 15, wherein a resource pool is common for the discovery signal and other communications.

23. The method of any of the preceding clauses, wherein the one or more parameters comprises a first set of radio resource control (RRC) parameters for transmitting the discovery signal and a second set of RRC parameters for transmitting the other communications.

24. The method of any of the preceding clauses, wherein the first set of RRC parameters indicates a number of subchannels for each discovery signal transmission.

25. The method of any of the preceding clauses, wherein the first set of RRC parameters indicates a modulation and coding scheme (MCS) for transmission of the discovery signal.

26. The method of clause 15, further comprising transmitting the sidelink discovery signal using a single multiple-input multiple-output (MIMO) layer.

27. An apparatus for wireless communication by a user equipment (UE), comprising:
a memory; and
at least one processor coupled to the memory and configured:
to determine a resource configuration for a sidelink discovery signal, wherein the resource configuration includes one or more parameters for the sidelink discovery signal; and
to measure link quality on at least one link between the UE and at least one candidate UE based on a discovery signal received from the at least one candidate UE according to the one or more parameters.

28. The apparatus of clause 27, wherein the at least one candidate UE comprises a plurality of candidate relay UEs, and wherein the at least on processor is further configured to select a relay UE from the plurality of candidate relay UEs based at least in part on the measured link quality.

29. An apparatus for wireless communication, by a sidelink user equipment (UE), comprising:
a memory; and
at least one processor coupled to the memory and configured:
to determine a resource configuration for a sidelink discovery signal, wherein the resource configuration includes one or more parameters for transmitting the sidelink discovery signal; and
to transmit the sidelink discovery signal to a remote sidelink UE based on the one or more parameters.

30. The apparatus of clause 29, wherein the remote sidelink UE comprises a relay UE.

The foregoing disclosure provides illustration and description, but is not intended to be exhaustive or to limit the aspects to the precise form disclosed. Modifications and variations may be made in light of the above disclosure or may be acquired from practice of the aspects. For example, although the description refers to selecting a relay UE, selecting of other types of sidelink UEs is contemplated.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    identifying a resource configuration for a sidelink discovery signal, the resource configuration including one or more transmission parameters for transmitting the sidelink discovery signal, the transmission parameters being common for a plurality of candidate UEs;
    measuring link quality on a plurality of links, at least one link of the plurality of links extending between the UE and each of the plurality of candidate UEs, the measuring occurring in accordance with a specific sidelink discovery signal received from each of the plurality of candidate UEs, the measuring associated at least in part with the one or more transmission parameters common for the plurality of candidate UEs; and
    identifying whether a received sidelink transmission is either the sidelink discovery signal or a sidelink data communication message in accordance with a logical channel used for the received sidelink transmission.

2. The method of claim 1, further comprising selecting a relay UE from the plurality of candidate relay UEs in accordance at least in part with the measured link quality.

3. The method of claim 1, wherein a resource pool for the sidelink discovery signal is separate from a resource pool for sidelink data communications.

4. The method of claim 3, wherein the one or more transmission parameters indicates a number of resource blocks (RBs) for the sidelink discovery signal.

5. The method of claim 4, wherein the number of RBs is indicated as a subchannel size or a number of subchannels for each sidelink discovery signal.

6. The method of claim 3, wherein the one or more transmission parameters indicates a modulation and coding scheme (MCS) for the sidelink discovery signal.

7. The method of claim 1, wherein a resource pool is common for the sidelink discovery signal and sidelink data communications.

8. The method of claim 7, wherein the one or more transmission parameters comprises a first set of radio resource control (RRC) parameters for the sidelink discovery signal and a second set of RRC parameters for sidelink data communications.

9. The method of claim 8, wherein the first set of RRC parameters indicates a number of subchannels for each sidelink discovery signal.

10. The method of claim 8 wherein the first set of RRC parameters indicates a modulation and coding scheme (MCS) for the sidelink discovery signal.

11. The method of claim 1, further comprising receiving the sidelink discovery signal using a single multiple-input multiple-output (MIMO) layer.

12. A method of wireless communication by a user equipment (UE), comprising:
    identifying a resource configuration for a sidelink discovery signal, the resource configuration including one or more parameters for the sidelink discovery signal; and
    measuring link quality on at least one link between the UE and at least one candidate UE in accordance with the sidelink discovery signal received from the at least one candidate UE, the measuring associated at least in part with the one or more parameters, a resource pool for the sidelink discovery signal being separate from a resource pool for sidelink data communications, the one or more parameters indicating a modulation and coding scheme (MCS) for the sidelink discovery signal, and the MCS is configured by setting a minimum MCS equal to a maximum MCS.

13. An apparatus for wireless communication by a user equipment (UE), comprising:
    memory; and
    at least one processor coupled to the memory and configured to:
        identify a resource configuration for a sidelink discovery signal, the resource configuration including one or more transmission parameters for transmitting the sidelink discovery signal, the transmission parameters being common for a plurality of candidate UEs;
        measure link quality on a plurality of links, at least one link of the plurality of links extending between the UE and each of the plurality of candidate UEs, the measuring occurring in accordance with a specific sidelink discovery signal received from each of the plurality of candidate UEs, the measuring associated at least in part with the one or more transmission parameters common for the plurality of candidate UEs; and
        identify whether a received sidelink transmission is either the sidelink discovery signal or a sidelink data communication message in accordance with a logical channel used for the received sidelink transmission.

14. The apparatus of claim 13, wherein the at least one processor is further configured to select a relay UE from the plurality of candidate relay UEs in accordance at least in part with the measured link quality.

15. An apparatus for wireless communication by a user equipment (UE), comprising:
    a memory; and
    at least one processor coupled to the memory and configured to:
        identify a resource configuration for a sidelink discovery signal, the resource configuration including one or more parameters for the sidelink discovery signal; and measure link quality on at least one link between the UE and at least one candidate UE in accordance with the sidelink discovery signal received from the at least one candidate UE, the measuring associated at least in part with the one or more parameters, a resource pool for the sidelink discovery signal being separate from a resource pool for sidelink data communications, the one or more parameters indicating a modulation and coding scheme (MCS) for the sidelink discovery signal, and the MCS is configured by setting a minimum MCS equal to a maximum MCS.

\* \* \* \* \*